(12) United States Patent
Smith

(10) Patent No.: US 11,781,975 B1
(45) Date of Patent: Oct. 10, 2023

(54) BROADBAND DIFFERENTIAL ABSORPTION SENSOR FOR DETECTING GASEOUS SPECIES

(71) Applicant: National Technology & Engineering Solutions of Sandia, LLC, Albuquerque, NM (US)

(72) Inventor: Mark W. Smith, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 140 days.

(21) Appl. No.: 17/482,619

(22) Filed: Sep. 23, 2021

Related U.S. Application Data

(60) Provisional application No. 63/092,148, filed on Oct. 15, 2020.

(51) Int. Cl.
    *G01N 21/31* (2006.01)
    *G01N 21/03* (2006.01)

(52) U.S. Cl.
    CPC ... *G01N 21/03* (2013.01); *G01N 2201/06113* (2013.01)

(58) Field of Classification Search
    CPC ............... G01N 21/31; G01N 2201/06113
    See application file for complete search history.

(56) References Cited

U.S. PATENT DOCUMENTS

| | | | | |
|---|---|---|---|---|
| 4,963,024 A | * | 10/1990 | Ulich | G01N 21/49 |
| | | | | 348/81 |
| 6,822,742 B1 | * | 11/2004 | Kalayeh | G01N 21/3504 |
| | | | | 356/432 |
| 8,500,849 B2 | | 8/2013 | Zhou et al. | |
| 9,310,295 B2 | | 4/2016 | Tabaru et al. | |
| 2007/0210254 A1 | * | 9/2007 | Killinger | G01N 21/39 |
| | | | | 250/338.5 |
| 2017/0025812 A1 | * | 1/2017 | Das | H01S 3/10061 |
| 2018/0224334 A1 | * | 8/2018 | O'Rourke | G01N 21/274 |

(Continued)

OTHER PUBLICATIONS https://www.rp-photonics.com/beer_lambert_law.html (Year: 2020).*

(Continued)

*Primary Examiner* — Hina F Ayub
(74) *Attorney, Agent, or Firm* — Samantha Updegraff; Calfee, Halter & Griswold LLP

(57) ABSTRACT

A remote sensor system comprising a laser transmitter that emits a pulse of broadband laser illumination comprising a plurality of wavelengths and a receiver configured to detect laser illumination backscatter. The sensor system further includes a computing system configured to determine a plurality of species number densities along a travel path of the laser illumination. Determining the plurality of species number densities includes determining a first number density of a first species based on a first set of optical transmission values from the backscatter data for a first subset of wavelengths of the plurality of wavelengths and a first attenuation cross-section of the first species. Additional species are determined based on additional sets of optical transmission values from the backscatter data for additional subsets of wavelengths of the plurality of wavelengths and additional cross-sections of additional species.

20 Claims, 10 Drawing Sheets

(56) References Cited

U.S. PATENT DOCUMENTS

2022/0205904 A1\* 6/2022 Reid ................ G01J 3/0208
2023/0086512 A1\* 3/2023 Sharifzadeh ......... A61B 5/1455

OTHER PUBLICATIONS

Cossel, et al., "Gas-phase broadband spectroscopy using active sources: progress, status, and applications", In Journal of the Optical Society of America B, vol. 34, No. 1, Jan. 2017, pp. 104-129.
Cossel, et al., "Open-path dual-comb spectroscopy to an airborne retroreflector", In Optica, vol. 4, No. 7, Jul. 2017, pp. 724-728.
Rieker, et al., "Frequency-comb-based remote sensing of greenhouse gases over kilometer air paths", In Optica, vol. 1, No. 5, Nov. 2014, pp. 290-298.

\* cited by examiner

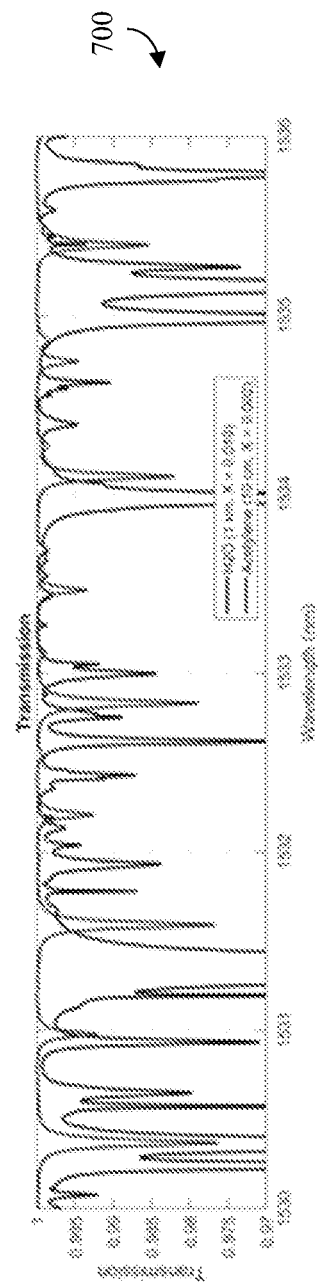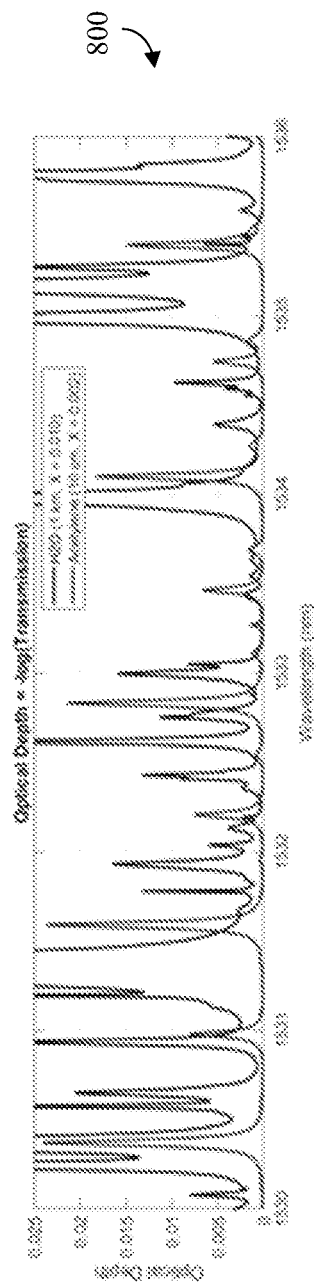

BROADBAND DIFFERENTIAL ABSORPTION SENSOR FOR DETECTING GASEOUS SPECIES

RELATED APPLICATION

This application claims priority to U.S. Provisional Patent Application No. 63/092,148, filed on Oct. 15, 2020, the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Conventionally, an approach for detecting a species of interest (e.g., in gaseous form) in the atmosphere involves tuning a narrow band laser to emit radiation with different wavelengths over time, where molecules of the species of interest absorb radiation having a first wavelength in the wavelengths and fail to absorb radiation having a second wavelength in the wavelengths. However, turbulence in the atmosphere (e.g., airflow, changes in pressure, etc.) introduces temporal fluctuations in atmospheric transmission that degrades measurement precision. More particularly, using the conventional approach referenced above, wavelengths of radiation are changed at 30 Hz while the turbulence in the atmosphere causes changes at a faster rate. This difference in change rates causes alterations in transmission of the radiation from the laser in the atmosphere, resulting in noise in data gathered by a receiver. Hence, it may be difficult to determine whether backscatter data detected by the receiver is due to a gas molecule absorbing radiation emitted by the laser or because the state of the atmosphere changed.

Moreover, interfering gases that also absorb and/or scatter the radiation at the wavelength degrade measurement accuracy. More specifically, measuring at a couple of discrete wavelengths makes it difficult to find wavelengths of radiation where the gas that is of interest absorbs and does not absorb the radiation, but that is totally unaffected by any other gas in the atmosphere. For instance, water vapor has multiple different absorption features that can result in an interference effect.

SUMMARY

The following is a brief summary of subject matter that is described in greater detail herein. This summary is not intended to be limiting as to the scope of the claims.

In an embodiment, described herein is a broadband remote sensor system configured to emit radiation having a plurality of wavelengths simultaneously and is further configured to determine a plurality of species number densities based on the plurality of wavelengths. The sensor system includes a laser source configured to emit broadband radiation along a travel path. The sensor system further includes a receiver configured to detect laser radiation that is returned after it passes through the atmosphere. As the laser radiation travels through the atmosphere, gases may absorb a portion of the radiation and/or particles may scatter a portion of the laser illumination, depending upon a wavelength of the portion. The receiver detects backscattered radiation and generates backscatter data based on that absorption and scattering.

The sensor system further includes a computing system that is in communication with the receiver. The computing system is configured to determine a number density for each respective gas or molecule along the travel path that absorbs or scatters the radiation having the plurality of wavelengths. The computing system can employ an algorithm that leverages a transmission value of a wavelength of the plurality of wavelengths detected by the receiver and an attenuation cross-section of a species to determine a number density of the species. Because the receiver detects a plurality of wavelengths of radiation simultaneously, the computing system can employ this algorithm to determine a plurality of species number densities using a single (broadband) laser pulse.

The above-described technologies present various advantages over conventional sensor systems. Conventional sensor systems are limited by tuning the narrow band lasers to emit radiation at different wavelengths, one at a time, to identify wavelengths where a desired gas absorbs and does not absorb the radiation. Because the sensor system has to check radiation at each wavelength to determine whether the gas absorbs or does not absorb the radiation, a change rate between wavelengths emissions is slower than a change rate of the atmosphere, resulting in noise in data collected by the receiver. Further, emitting radiation in a narrow band (having a single wavelength at a time) makes it difficult to distinguish between a gas of interest and an intervening gas that also absorbs radiation having the same wavelength. In contrast, the technologies described herein emit broadband laser radiation comprising radiation having a plurality of wavelengths simultaneously, and a computing system configured to determine a plurality of species number densities (for numerous types of gas phase molecules) simultaneously, which improves the precision and accuracy of the measurement.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 7 is a graph illustrating a calculated transmission spectrum.

FIG. 8 is a graph illustrating a calculated optical depth for a transmission spectrum.

DETAILED DESCRIPTION

Figure 1:
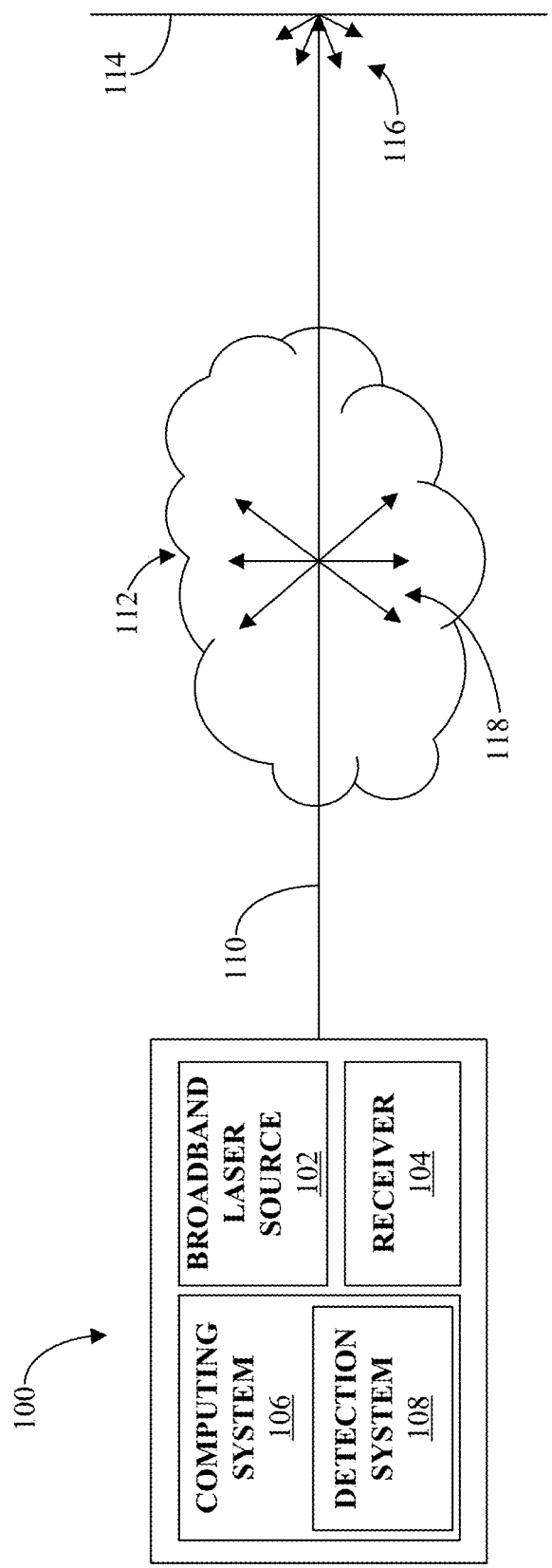
FIG. 1 is a functional block diagram of a broadband remote sensor system.

Various technologies pertaining to a remote sensor system for emitting broadband laser radiation comprising a plurality of wavelengths are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Further, as used herein, the term "exemplary" is intended to mean serving as an illustration or example of something and is not intended to indicate a preference.

Disclosed is a remote sensor system that includes a laser source that emits radiation having a plurality of wavelengths simultaneously along a travel path. The sensor system then determines a plurality of species number densities based on radiation emitted by the laser source that has passed through a region of interest (e.g., that has not been absorbed) that is detected by a receiver. More particularly, the sensor system is configured to use an algorithm that leverages a transmission value of a wavelength of the plurality of wavelengths detected by the receiver and an attenuation cross-section of a species to determine a number density of the species. By emitting a plurality of wavelengths simultaneously, the sensor system can improve accuracy by avoiding atmosphere turbulence. By detecting a plurality of wavelengths simultaneously, the sensor system improves precision by calculating number densities for multiple species.

Turning to FIG. 1, illustrated is a functional block diagram of a remote absorption sensor system 100 configured to remotely detect (e.g., identify) gaseous species in an atmosphere. The absorption sensor system 100 can be part of another sensor system, such as a light detection and ranging (LIDAR) sensor system. The absorption sensor system 100 comprises a broadband laser source 102 that emits radiation over a frequency spectrum that includes radiation of multiple wavelengths into an external environment. The absorption sensor system 100 also includes a receiver 104 configured to detect backscatter of the radiation. The absorption sensor system 100 further comprises a computing system 106 that includes a detection system 108 configured to determine a number density (e.g., concentration as a function of position) of a species (e.g., in gaseous form) along a path of the broadband radiation, where the detection system 108 determines the number density based on the backscatter detected by the receiver 104. The computing system 106 includes a processor and memory that includes computer-executable instructions that are executed by the processor. In an example, the processor can be or include a graphics processing unit (GPU), a plurality of GPUs, a central processing unit (CPU), a plurality of CPUs, an application-specific integrated circuit (ASIC), a microcontroller, a field programmable gate array (FPGA), or the like. As will be described in detail below, the detection system 108 is configured to determine a number density of at least one species based on the backscatter detected by the receiver 104.

As can be seen in FIG. 1, the broadband laser source 102 is configured to emit the radiation along a travel path 110 that passes through a region of interest 112 in the atmosphere before impacting a surface 114 (e.g., surface of the Earth, wall of a building, etc.). The surface 114 then scatters (e.g., absorbs, reflects, and/or refracts) radiation that has traveled through the region of interest 112, indicated at 116, and a portion of this scattered radiation travels back through the region of interest 112 and toward the absorption sensor system 100, whereupon the scattered radiation is detected by the receiver 104. As briefly mentioned above, as the radiation travels along the travel path 110, the radiation may come into contact with species that cause attenuation of the radiation (e.g., scattering and/or absorption of the radiation), indicated at 118. The attenuation 118 can be a function of wavelength of the radiation emitted by the broadband laser source 102 that comes into contact with the species; e.g., a first species attenuates radiation having a first wavelength while the first species does not attenuate radiation having a second wavelength.

As noted above, conventionally, detecting existence of gaseous species of a particular type includes tuning a narrow band laser such that the laser emits radiation of different wavelengths over time, where gas molecules of a particular type absorb radiation at one of the wavelengths but fail to absorb radiation at another of the wavelengths. However, turbulence introduces temporal fluctuations in atmospheric transmission that degrades measurement precision. More particularly, in the conventional approach, the rate of transition between wavelengths is slower than rate of change in transmission properties caused by turbulence in the atmosphere, resulting in noise in data generated by a receiver. In turn, this results in difficulty determining whether backscatter data detected by the receiver is because a gas molecule absorbed the laser or because the state of the atmosphere changed.

Moreover, interfering gases that also absorb and/or scatter radiation at the wavelength degrade measurement accuracy. More specifically, measuring based upon radiation emitted at a couple discrete wavelengths makes it difficult to find wavelengths where the gas that is of interest absorbs and does not absorb radiation but that is totally unaffected by any other gas in the atmosphere. For instance, water vapor has multiple different absorption features that can result in an interference effect.

The laser source 102 is configured to emit broadband radiation comprising radiation having a plurality of wavelengths and the receiver 104 is configured to measure radiation having all those wavelengths at once. Because the receiver 104 is measuring radiation having multiple wavelengths at once, the absorption sensor system 100 improves precision of the measurement because the measurement is not as heavily impacted by atmospheric turbulence. Moreover, because the receiver 104 measures radiation having multiple wavelengths simultaneously, the computing system 106 can identify multiple gases in the region of interest 112; thus, accuracy of the absorption sensor system 100 is greater than conventional approaches, as will be described in detail below.

Figure 2:
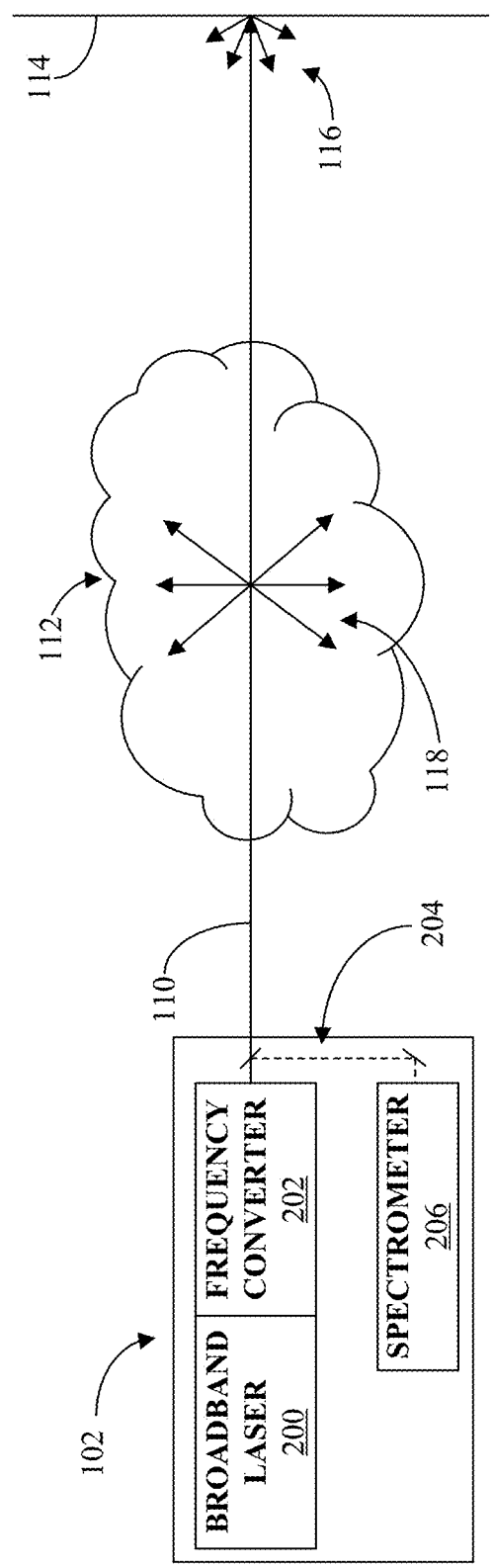
FIG. 2 is a functional block diagram of a broadband laser source for a broadband remote sensor system.

Turning now to FIG. 2, illustrated is an embodiment of a laser source 102 configured to output radiation over a spectrum having a plurality of wavelengths simultaneously. In the illustrated embodiment, the laser source 102 includes a broadband laser 200 that generates and emits radiation having a plurality of different wavelengths. In an example, the broadband laser 200 is a fiber laser. The broadband laser 200 can be configured to emit any suitable spectrum of wavelengths and the spectrum may depend on a specie or species that are to be detected in a region of interest of the atmosphere. For instance, the broadband laser 200 can be configured to emit radiation having wavelengths between 2 and 2.5 microns where various molecules have absorption features. In another example, the broadband laser 200 can be configured to emit radiation having wavelengths, where a portion of the wavelengths are absorbed by a particular gas or gases, such as carbon-dioxide, methane, and/or the like.

The laser source 102 can further include a frequency converter 202 that upconverts or downconverts radiation prior to emission of the radiation into the atmosphere. The laser source 102 further includes equipment for measuring an initial intensity of the radiation over several wavelengths. For instance, in the illustrated embodiment, the laser source 102 includes structures, illustrated at 204, that direct radiation toward a spectrometer 206 that measures an initial intensity of the radiation. Any suitable spectrometer 206 may be employed such as a moderate resolution spectrometer and/or a high-resolution spectrometer.

Figure 3:
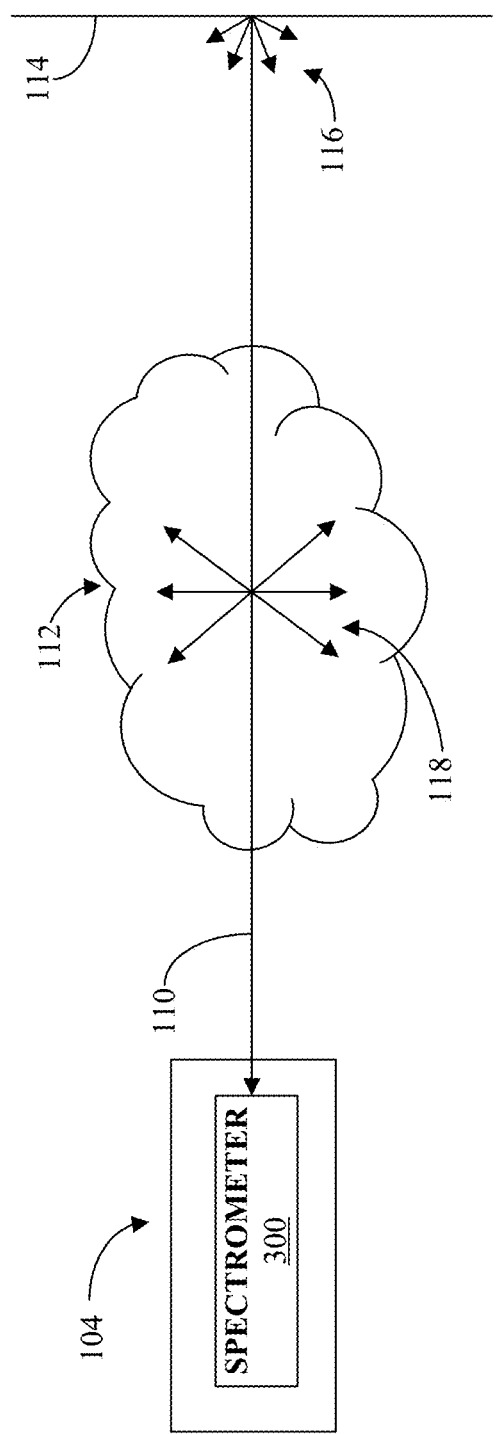
FIG. 3 is a functional block diagram of a receiver for broadband laser source for a broadband remote sensor system.

Turning now to FIG. 3, illustrated is an embodiment of a receiver 104 configured to simultaneously detect backscattered radiation having multiple wavelengths. In the illustrated embodiment, the receiver comprises a spectrometer 300. Any suitable spectrometer may be employed such as a moderate resolution spectrometer and/or a high-resolution spectrometer. The receiver 104 is further configured to output backscatter data to the computing system 106 for use in identifying one or more (gaseous) species in the atmosphere.

Subsequent to receiving the backscatter data from the receiver 104, the detection system 108 of the computing system 106 analyzes the backscatter data to determine number densities of different species along the travel path 110 of the emitted radiation. The detection system 108 can be configured to perform the analysis by employing one or more algorithms to calculate the number densities. Eq. 1 shows how distribution of different absorbing molecules and scattering particles change transmission characteristics of the atmosphere and how the combination of the spatial distribution of those molecules and particles along the travel path 110 is tied to the transmission of radiation of a given wavelength along that travel path 110:

$$T(\lambda, \Delta x) \equiv I(\lambda, \Delta x)/I_0(\lambda) = \exp\left[-\sum_{i=1}^{N}\int_0^{\Delta x}\sigma_i(\lambda, x)n_i(x)dx\right] \quad (1)$$

where $T(\lambda, \Delta x)$ is transmission of radiation at wavelength $\lambda$ for a path that starts at $x=0$ and extends to $x=\Delta x$; $I(\lambda, \Delta x)$ is an intensity of radiation at wavelength $\lambda$ at the end of the travel path $\Delta x$; $I_0(\lambda)$ is an initial intensity at $x=0$; $\sigma_i(\lambda, x)$ is an attenuation cross-section of species i at wavelength $\lambda$ at position x along the travel path $\Delta x$; $n_i(x)$ is a number density of species i at location x along the travel path $\Delta x$, and N is a total number of different attenuating species in the region of interest 112.

In one embodiment, determining the number densities for the different attenuating species is conducted by non-linear fitting of multiples in Eq. 1.

In another embodiment, if the time gating for the receiver 104 defines a travel path 110 that is short enough that temperature, pressure, and number densities are basically constant for a particular wavelength (e.g., wavelength $\lambda$), then attenuation cross-section can also be constant. Accordingly, the integrals in Eq. 1 can be reduced to the form given in Eq. 2 below:

$$\int_0^{\Delta x}\sigma_i(\lambda, x)n_i(x)dx = \sigma_i(\lambda)n_i\Delta x \quad (2)$$

Eq. 2 can be placed into Eq. 1 and converted to an equation to determine optical depth, illustrated in Eq. 3 below.

$$OD(\lambda, \Delta x) \equiv -\log[I(\lambda, \Delta x)/I_0(\lambda)] = \sum_{i=1}^{N}\sigma_i(\lambda)n_i\Delta x = \sum_{i=1}^{N}n_if_i(\lambda) \quad (3)$$

As can be seen in Eq. 3, the optical depth, or OD, which is a function of wavelength, is a linear sum of functions $f_i(\lambda)$, where the weighting coefficients $n_i$ are unknown number densities for the different attenuating species, and $f_i(\lambda)$ represents the product of the known attenuation cross-section for each species and the common travel path 110 length. The number densities for different attenuating species can be determined from the spectrum of wavelengths detected by the receiver 104 by determining the values for $n_i$ that produce the best fit to the measured OD values for each wavelength (e.g., wavelength $\lambda$).

Figure 4:
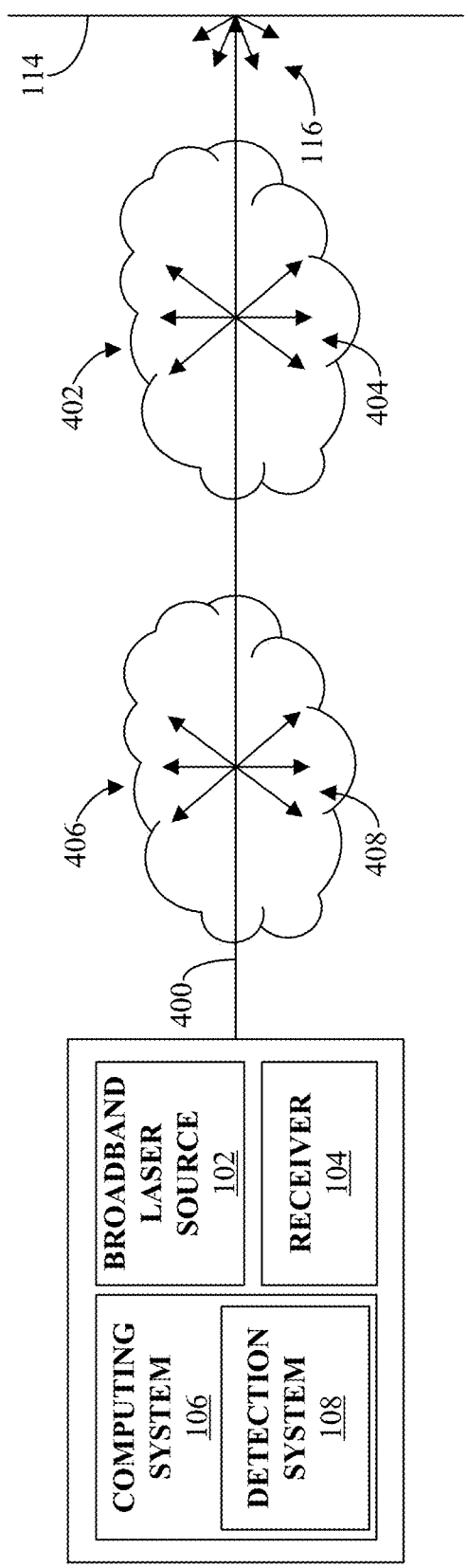
FIG. 4 is another functional block diagram of a broadband remote sensor system.

As mentioned above, by generating multiple wavelength measurements, the absorption sensor system 100 can account for intervening species that absorb and/or scatter the same wavelength of radiation as a species of interest. Turning now to FIG. 4, illustrated is an embodiment of the absorption sensor system 100 employed to detect a first species. Accordingly, the laser source 102 emits radiation having a spectrum of wavelengths along a travel path 400, where the wavelengths include a wavelength of radiation that is attenuated by the first species. The travel path 400 passes through a region 402 that includes the first species, causing a portion of the radiation emitted by the laser source 102 (having the wavelength) to attenuate, such as via absorption, indicated at 404. However, the travel path 400 also passes through a second region 406 that includes other species that attenuate the radiation at the wavelength, indicated at 408. Traditionally, this attenuation at the second region 406 impacts the accuracy of a conventional sensor system, because a conventional sensor system has difficulty distinguishing between attenuation caused by species of interest and attenuation caused by intervening species. The analysis described above improves the accuracy of the detection by determining a number density for each of the different attenuating species (e.g., the first species and the intervening species).

Figure 5:
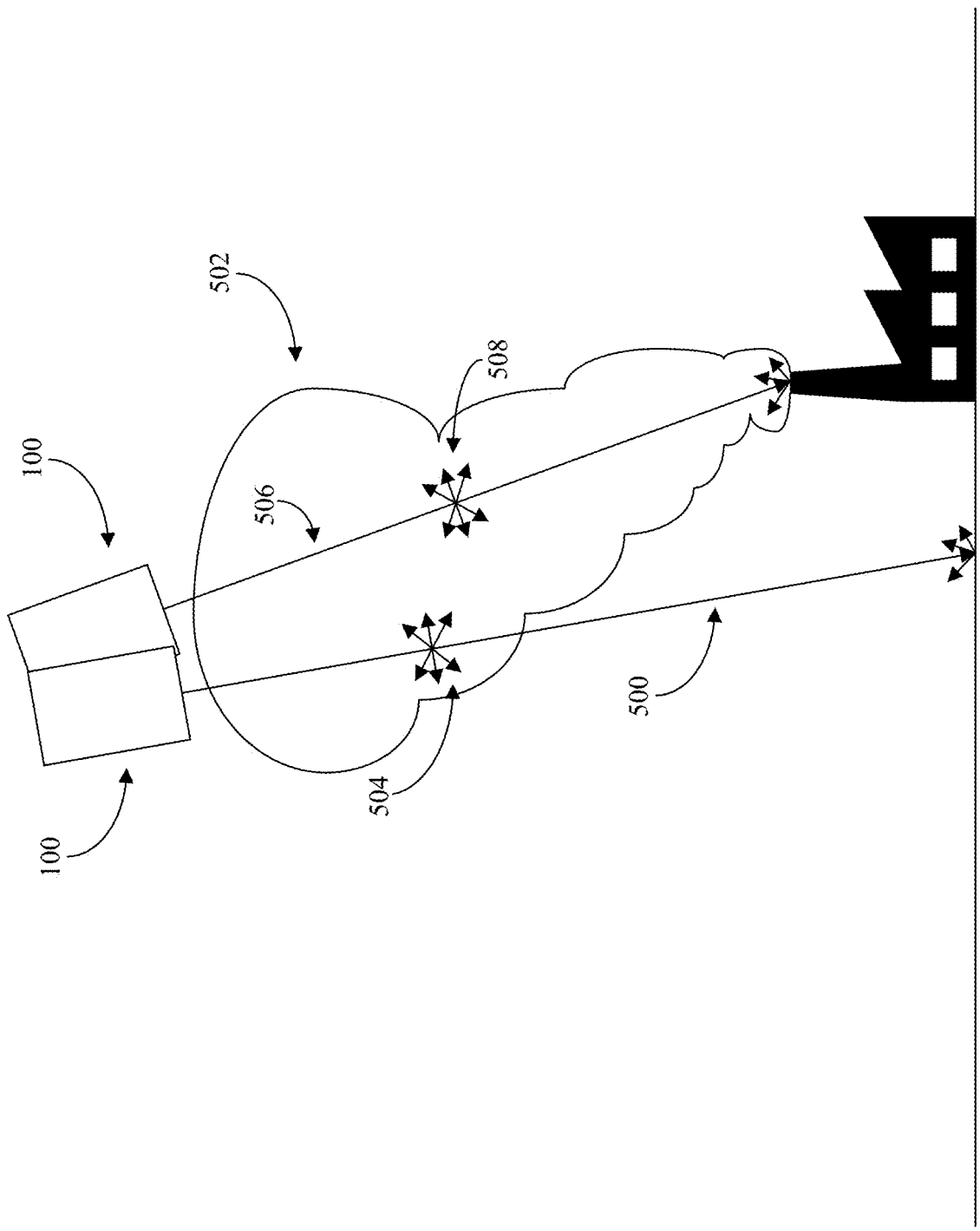
FIG. 5 is a further functional block diagram of a broadband remote sensor system.

Because the sensor system 100 calculates number density, the sensor system 100 can be used to locate an area of high concentration for a specific species. Illustrated in FIG. 5 is an embodiment of the sensor system 100 emitting a plurality of pulses to locate an area of high concentration of a first gaseous species emitted by a factory (e.g., carbon dioxide). Namely, the sensor system 100 emits a first pulse of radiation along a first travel path 500 that passes through a region 502 that includes the first species. The first species causes attenuation of a portion of the radiation traveling along the first travel path 500, indicated at 504. The receiver 104 detects this attenuation 504, and the detected attenuation is used by the computing system 106 to determine a first number density of the first species.

The sensor system then emits a second pulse of laser illumination along a second travel path 506, which also passes through the region 502 that includes the first species. As can be seen in FIG. 5, the first travel path 500 and the second travel path 506 go through different portions of the region 502. Similar to first pulse, the first species causes attenuation of a portion of the radiation traveling along the second path 506, indicated at 508. The receiver 104 detects this attenuation 508, and the detected attenuation is used by the computing system 106 to determine a second number density of the first species. Due to the second travel path 506 intersecting an outlet of a smokestack of the factory outputting the first species, the second number density is higher than the first density. Thus, by employing multiple pulses and calculating a number density for each pulse, the sensor system 100 can be used to locate regions of relatively high concentration of a gas or gases of interest.

Figure 6:
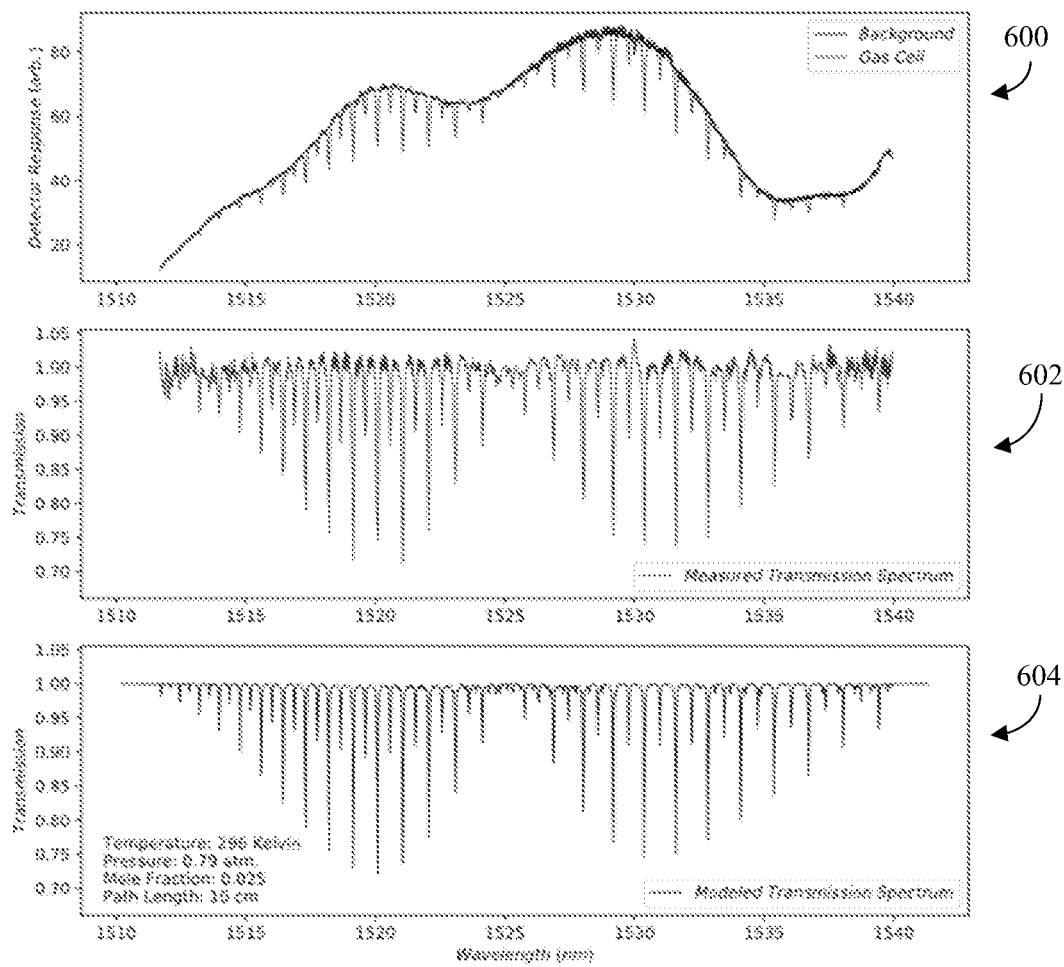
FIG. 6 depicts graphs that illustrate different transmission spectrums generated by broadband remote sensor systems.

Turning now to FIG. 6, illustrated are a plurality of charts illustrating a measured transmission spectrum of acetylene collected using a gas cell in a laboratory. Gas absorption/transmission spectra show unique molecular "fingerprints." Spectra from different gases can overlap, making it difficult to identify a specific gas. Water vapor can be especially problematic for atmospheric remote sensing because it is ubiquitous, variable, and has many absorption features. Turning now to FIG. 7, illustrated is a chart 700 illustrating calculated transmission spectrum of acetylene that is overlaid with absorption from water vapor in the atmosphere. The calculated chart 700 is narrowed to the wavelength range 1530-1536 nm and a transmission value in the range of 0.97-1.

Turning now to FIG. 8, illustrated is a chart 800 comprising an optical depth value over the wavelength range 1530-1536 nm. The optical depth comprises a negative logarithm of the transmission calculated above in chart 700. The optical depth in chart 800 includes an optical depth for the acetylene transmission and the water vapor transmission.

Figure 9:
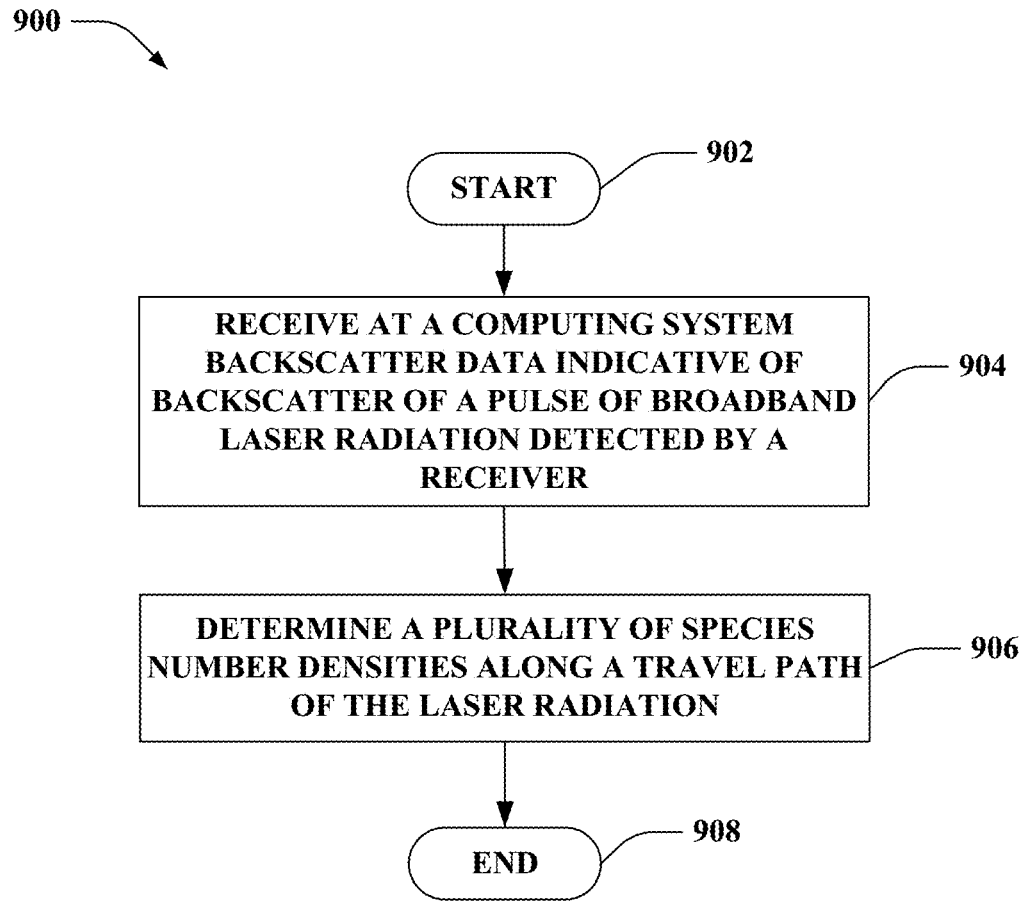
FIG. 9 is a flow diagram that illustrates a methodology for determining a plurality of species number densities using a broadband remote sensor system.
Figure 10:
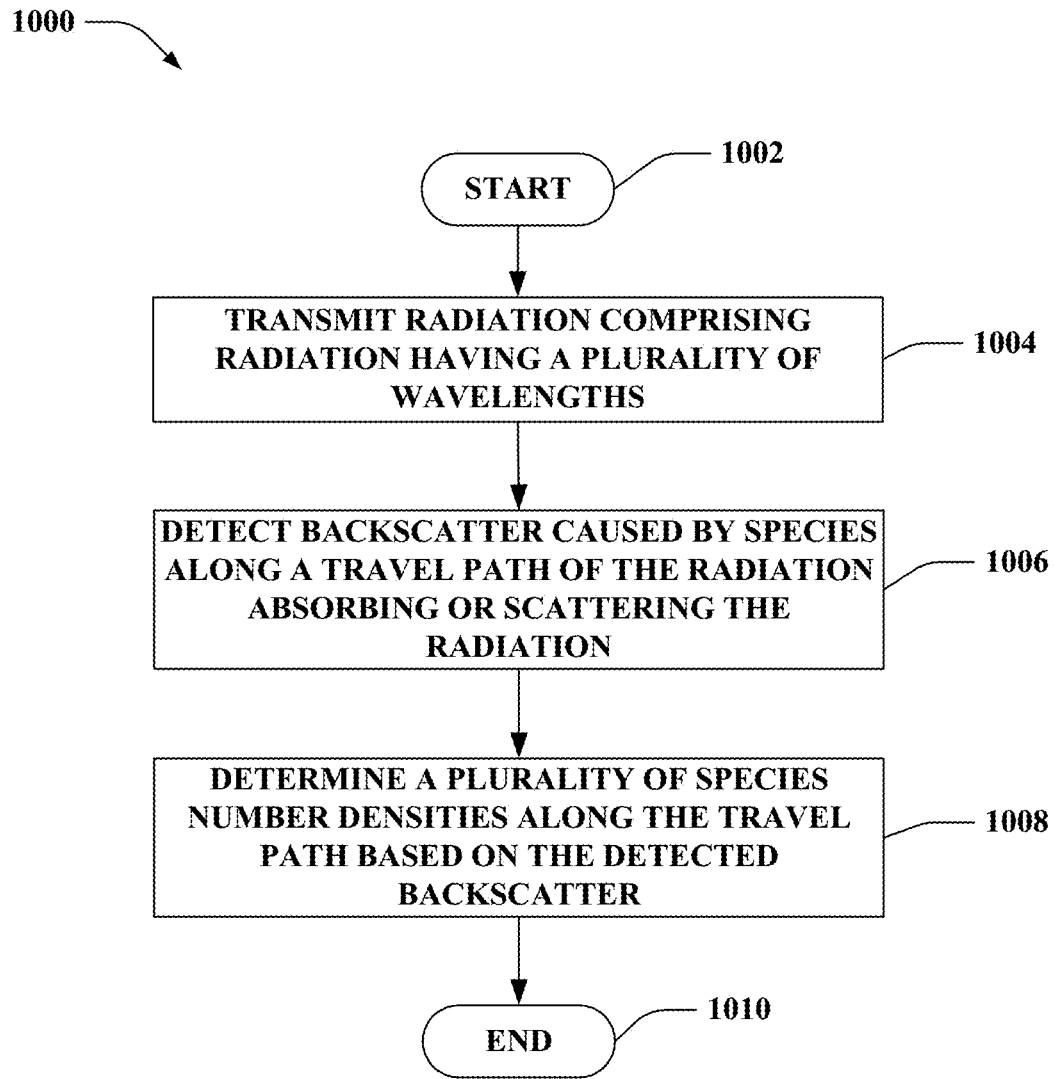
FIG. 10 is a flow diagram that illustrates a methodology for operation of a broadband remote sensor system.

FIG. 9 illustrates a methodology relating to calculating a plurality of number densities for species along a travel path of broadband laser radiation. FIG. 10 illustrates an exemplary methodology relating to operation of a remote sensor system. While the methodologies 900 and 1000 are shown as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring solely to FIG. 9, the methodology 900 starts at 902, and at 904, a computing system receives backscatter data indicative of backscatter of a pulse of broadband laser radiation detected by a receiver. The pulse of broadband laser radiation can comprise radiation having a plurality of wavelengths. The pulse of broadband laser radiation is emitted by a laser source. At 906, the computing system can determine a plurality of number densities for different species along a travel path of the radiation. Determining the number densities can include determining a first number density of a first species based on a first transmission value from the backscatter data for a first wavelength of the plurality of wavelengths and a first attenuation cross-section of the first species. Determining the number densities can further include determining a second number density of a second species based on a second optical transmission value from the backscatter data for a second wavelength and a second attenuation cross-section of the second species. The first wavelength and the second wavelength can be different. The methodology 900 ends at 908.

With reference now to FIG. 10, the methodology 1000 starts at 1002, and at 1004, a laser source emits broadband laser radiation comprising radiation having a plurality of wavelengths along a travel path. At 1006, a receiver detects backscatter caused by one or more species along the travel path of the radiation absorbing and/or scattering the radiation. The species can comprise a gas, an aerosol particle, and/or the like. At 1008, a computing system determines a plurality of species number densities along the travel path based on the detected backscatter. The methodology 1000 ends at 1010.

The features described herein relate to a broadband remote sensor system according to at least the examples provided below:

(A1) In one aspect, some embodiments include a remote absorption sensor that includes a laser source, where the laser source is configured to emit a pulse of radiation comprising a plurality of wavelengths. The absorption sensor further includes a receiver configured to detect radiation backscatter based upon the pulse of the radiation emitted by the laser source. The absorption sensor also includes a computing system in communication with the laser source and the receiver, where the computing system comprises a processor and memory that stores computer-executable instructions that, when executed by the processor, cause the processor to perform acts. The acts include receiving backscatter data from the receiver, where the backscatter data is indicative of the detected radiation backscatter. The acts further include determining a plurality of species number densities along a travel path of the emitted pulse of radiation. Determining the plurality of species number densities includes determining a first number density of a first species based on a first set of optical transmission values from the backscatter data for a first subset of wavelengths of the plurality of wavelengths and a first attenuation cross-section of the first species. Determining the plurality of species number densities further includes determining a second number density of a second species based on a second set of optical transmission values from the backscatter data for a second subset of wavelengths of the plurality of wavelengths and a second attenuation cross-section of the second species, wherein the first subset of wavelengths and the second subset of wavelengths are different.

(A2) In some embodiments of the remote sensor of (A1), the laser source comprises a broadband laser source and a frequency converter, where the laser source further comprises a spectrometer configured to detect an initial intensity of the radiation emitted by the laser source.

(A3) In some embodiments of the remote sensor of at least one of (A1)-(A2), the receiver comprises a spectrometer configured to detect the radiation backscatter, where the receiver further comprises a continuously variable order sorting filter configured to filter radiation entering the spectrometer.

(A4) In some embodiments of the remote sensor of at least one of (A1)-(A3), determining the plurality of species number densities includes determining a third number density of a third species based on a third set of optical transmission values from the backscatter data for a third subset of wavelengths of the plurality of wavelengths and a third attenuation cross-section of the third species, where the third subset of wavelengths is different from the first subset of wavelengths and the second subset of wavelengths.

(A5) In some embodiments of the remote sensor of at least one of (A1)-(A4), determining the plurality of species number densities includes determining a third number density of a third species based on the second optical transmission values from the backscatter data for the second subset of wavelengths and the second attenuation cross-section.

(A6) In some embodiments of the remote sensor of at least one of (A1)-(A5), determining the first number density further comprises determining an optical depth of the first subset of wavelengths, where the optical depths of the first subset of wavelengths are a function of the first optical transmission values.

(A7) In some embodiments of the remote sensor of at least one of (A1)-(A6), determining the first number density additionally comprises fitting the first number density to the determined optical depths of the first subset of wavelengths.

(A8) In some embodiments of the remote sensor of at least one of (A1)-(A7), the laser transmitter is further configured to emit a second pulse of radiation, wherein the second pulse of radiation travels along a second travel path, where the travel path and the second travel path are different. The acts yet further include receiving second backscatter data from the receiver indicative of detected backscatter of the second pulse of radiation. The acts also include determining a second plurality of species number densities along the second travel path of the second pulse of radiation. Determining the second plurality of species number densities includes determining a third number density of the first species based on a third optical transmission value from the second backscatter data for the first subset of wavelengths of the plurality of wavelengths and the first attenuation cross-section of the first species.

(A9) In some embodiments of the remote sensor of at least one of (A1)-(A8), the laser source comprises a fiber laser.

(A10) In some embodiments of the remote sensor of at least one of (A1)-(A9), the plurality of wavelengths are in a range of 2 to 2.5 microns.

(B1) In another aspect, some embodiments include a method, where the method includes receiving, at a computing system, backscatter data indicative of backscatter of a pulse of radiation detected by a receiver. The pulse of radiation comprises radiation having a plurality of wavelengths, where the pulse of radiation is emitted by a laser source. The method also includes determining a plurality of species number densities along a travel path of the radiation. Determining the plurality of species number densities includes determining a first number density of a first species based on a first set of optical transmission values from the backscatter data for a first subset of wavelengths of the plurality of wavelengths and a first attenuation cross-section of the first species. Determining the plurality of species number densities further includes determining a second number density of a second species based on a second set of optical transmission values from the backscatter data for a second subset of wavelengths of the plurality of wavelengths and a second attenuation cross-section of the second species, where the first subset of wavelengths and the second subset of wavelengths are different.

(B2) In some embodiments of the method of (B1), determining the plurality of species number densities further includes determining a third number density of a third species based on a third set of optical transmission values from the backscatter data for a third subset of wavelengths of the plurality of wavelengths and a third attenuation cross-section of the third species, where the third subset of wavelengths is different from the first subset of wavelengths and the second subset of wavelengths.

(B3) In some embodiments of at least one of the methods of (B1)-(B2), determining the plurality of species number densities further includes determining a third number density of a third species based on the second set of optical transmission values from the backscatter data for the second subset of wavelengths and the second attenuation cross-section.

(B4) In some embodiments of at least one of the methods of (B1)-(B3), determining the first number density further comprises determining an optical depth of the first wavelength, where the optical depth of the first subset of wavelengths is a function of the first optical transmission values.

(B5) In some embodiments of at least one of the methods of (B1)-(B4), determining the first number density additionally comprises fitting the first number density to the determined optical depths of the first subset of wavelengths.

(B6) In some embodiments of at least one of the methods of (B1)-(B5), the method further includes receiving, at the computing system, second backscatter data indicative of backscatter of a second pulse of radiation detected by the receiver. The method yet further includes determining a second plurality of species number densities along a second travel path of the second pulse of radiation. Determining the second plurality of species number densities includes determining a third number density of the first species based on a third set of optical transmission values from the second backscatter data for the first wavelength of the plurality of wavelengths and the first attenuation cross-section of the first species.

(C1) In another aspect, some embodiments comprise a computing system that comprises a processor and memory that stores computer-executable instruction that, when executed by the processor, cause the processor to perform acts. The acts include receiving backscatter data from a receiver indicative of backscatter of a pulse of radiation detected by a receive. The pulse of radiation comprises radiation having a plurality of wavelengths, where the pulse of radiation is emitted by a laser source. The acts also include determining a plurality of species number densities along a travel path of the radiation. Determining the plurality of species number densities includes determining a first number density of a first species based on a first set of optical transmission values from the backscatter data for a first subset of wavelengths of the plurality of wavelengths and a first attenuation cross-section of the first species. Determining the plurality of species number densities further includes determining a second number density of a second species based on a second set of optical transmission values from the backscatter data for a second subset of wavelengths of the plurality of wavelengths and a second attenuation cross-section of the second species, wherein the first subset of wavelengths and the second subset of wavelengths are different.

(C2) In some embodiments of the computing system of (C1), determining the plurality of species number densities yet further includes determining a third number density of a third species based on a third set of optical transmission values from the backscatter data for a third subset of wavelengths of the plurality of wavelengths and a third attenuation cross-section of the third species, where the third subset of wavelengths is different from the first subset of wavelengths and the second subset of wavelengths.

(C3) In some embodiments of the computing system of at least one of (C1)-(C2), determining the first number density further comprises determining an optical depth of the first subset of wavelengths, where the optical depth of the first subset of wavelengths is a function of the first optical transmission value.

(C4) In some embodiments of the computing system of at least one of (C1)-(C3), determining the first number density additionally comprises fitting the first number density to the determined optical depths of the first subset of wavelengths.

Figure 11:
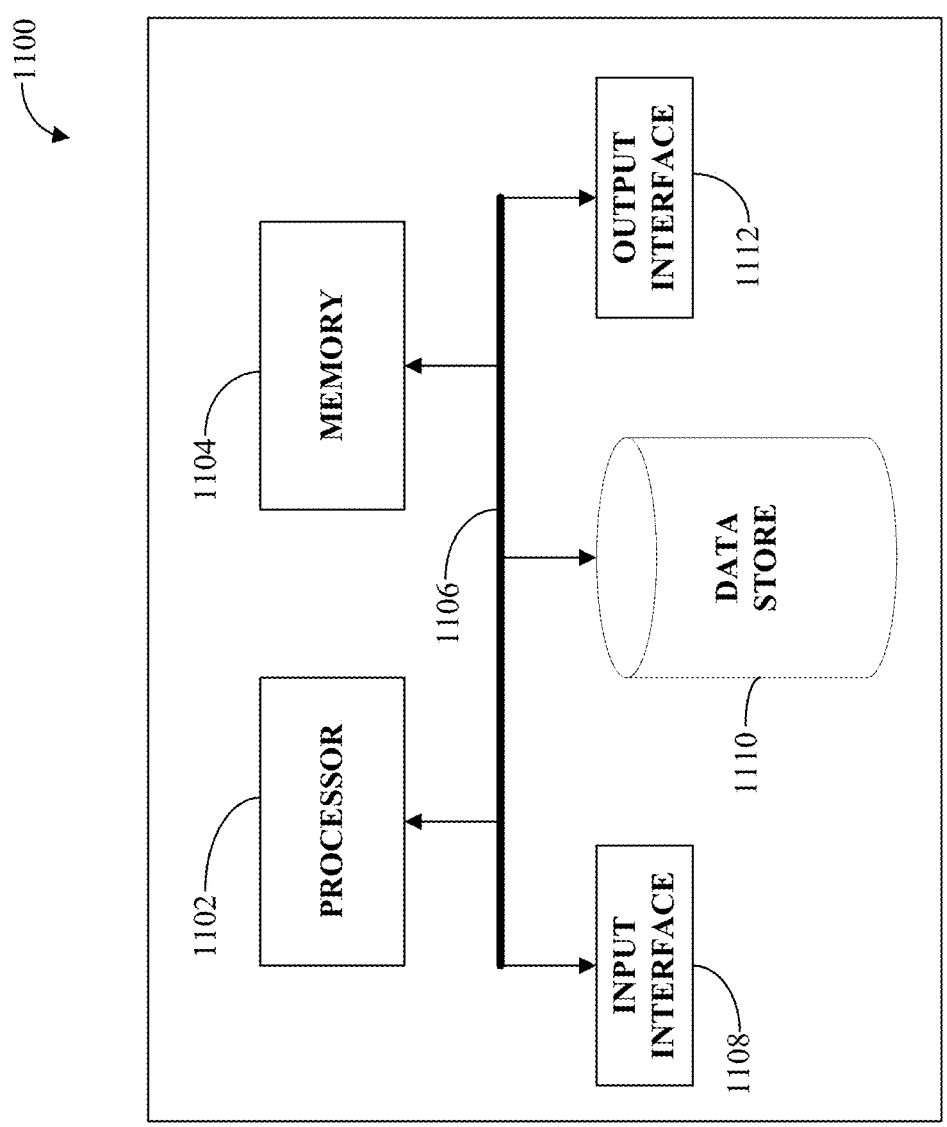
FIG. 11 illustrates a computing system.

Referring now to FIG. 11, a high-level illustration of an exemplary computing device that can be used in accordance with the systems and methodologies disclosed herein is illustrated. For instance, the computing device 1100 may be or include the computing system 106. The computing device 1100 includes at least one processor 1102 that executes instructions that are stored in a memory 1104. The instructions may be, for instance, instructions for implementing functionality described as being carried out by one or more components discussed above or instructions for implementing one or more methods described above. The processor 1102 may be a GPU, a plurality of GPUs, a CPU, a plurality of CPUs, a multi-core processor, etc. The processor 1102 may access the memory 1104 by way of a system bus 1106. In addition to storing executable instructions, the memory 1104 may also store transmission spectra information, etc.

The computing device 1100 additionally includes a data store 1110 that is accessible by the processor 1102 by way of the system bus 1106. The data store 1110 may include executable instructions, transmission spectra information, etc. The computing device 1100 also includes an input interface 1108 that allows external devices to communicate with the computing device 1100. For instance, the input interface 1108 may be used to receive instructions from an external computer device, from a user, etc. The computing device 1100 also includes an output interface 1112 that interfaces the computing device 1100 with one or more external devices. For example, the computing device 1100 may display text, images, etc., by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A remote absorption sensor comprising:
a laser source, wherein the laser source is configured to emit a pulse of radiation comprising a plurality of wavelengths;
a receiver configured to detect radiation backscatter, where the radiation backscatter is based upon the pulse of radiation emitted by the laser source;
a computing system in communication with the laser source and the receiver, wherein the computing system comprises:
a processor; and memory that stores computer-executable instruction that, when executed by the processor, cause the processor to perform acts comprising:
receiving backscatter data from the receiver, the backscatter data being indicative of the detected radiation backscatter; and
determining a plurality of species number densities along a travel path of the emitted pulse of radiation, wherein determining the plurality of species number densities includes determining a first number density of a first species based on a first set of optical transmission values from the backscatter data for a first subset of wavelengths of the plurality of wavelengths and a first attenuation cross-section of the first species, wherein determining the plurality of species number densities further includes determining a second number density of a second species based on a second set of optical transmission values from the backscatter data for a second subset of wavelengths of the plurality of wavelengths and a second attenuation cross-section of the second species, wherein the first subset of wavelengths and the second subset of wavelengths are different.

2. The remote sensor of claim 1, wherein the laser source comprises a broadband laser source and a frequency converter, wherein the laser source further comprises a spectrometer configured to detect an initial intensity spectrum of the radiation emitted by the laser source.

3. The remote sensor of claim 1, wherein the receiver comprises a spectrometer configured to detect the radiation backscatter, wherein the receiver further comprises a continuously variable order sorting filter configured to filter radiation entering the spectrometer.

4. The remote sensor of claim 1, wherein determining the plurality of species number densities includes determining a third number density of a third species based on a third set of optical transmission values from the backscatter data for a third subset of wavelengths of the plurality of wavelengths and a third attenuation cross-section of the third species, wherein the third subset of wavelengths is different from the first subset of wavelengths and the second subset of wavelengths.

5. The remote sensor of claim 1, wherein determining the plurality of species number densities includes determining a third number density of a third species based on the second set of optical transmission values from the backscatter data for the second subset of wavelengths and the second attenuation cross-section.

6. The remote sensor of claim 1, wherein determining the first number density further comprises determining an optical depth of the first subset of wavelengths, wherein the optical depth of the first subset of wavelengths is a function of the first optical transmission value.

7. The remote sensor of claim 6, wherein determining the first number density additionally comprises fitting the first number density to the determined optical depth of the first subset of wavelengths.

8. The remote sensor of claim 1, wherein the laser transmitter is further configured to emit a second pulse of radiation, wherein the second pulse of radiation travels along a second travel path, wherein the travel path and the second travel path are different, wherein the acts further comprise:
receiving second backscatter data from the receiver indicative of detected backscatter of the second pulse of radiation; and
determining a second plurality of species number densities along the second travel path of the second pulse of radiation, wherein determining the second plurality of species number densities includes determining a third number density of the first species based on a third optical transmission value from the second backscatter data for the first subset of wavelengths of the plurality of wavelengths and the first attenuation cross-section of the first species.

9. The remote sensor of claim 1, wherein the laser source comprises a fiber laser.

10. The remote sensor of claim 1, wherein the plurality of wavelengths are in a range of 2 to 2.5 microns.

11. The remote absorption sensor of claim 1, the acts further comprising:
computing a first optical depth for the first subset of wavelengths based upon the backscatter data; and
computing a second optical depth for the second subset of wavelengths based upon the backscatter data, where the first number density is determined based upon the first optical depth and the second number density is determined based upon the second optical depth.

12. A method comprising:
receiving, at a computing system, backscatter data indicative of backscatter of a pulse of radiation detected by a receiver, wherein the pulse of radiation comprises radiation having a plurality of wavelengths, wherein the pulse of radiation is emitted by a laser source; and
determining a plurality of species number densities along a travel path of the radiation, wherein determining the plurality of species number densities includes determining a first number density of a first species based on a first set of optical transmission values from the backscatter data for a first subset of wavelengths of the plurality of wavelengths and a first attenuation cross-section of the first species, wherein determining the plurality of species number densities includes determining a second number density of a second species based on a second set of optical transmission values from the backscatter data for a second subset of wavelengths of the plurality of wavelengths and a second attenuation cross-section of the second species, wherein the first subset of wavelengths and the second subset of wavelengths are different.

13. The method of claim 12, wherein determining the plurality of species number densities includes determining a third number density of a third species based on a third set of optical transmission values from the backscatter data for a third subset of wavelengths of the plurality of wavelengths and a third attenuation cross-section of the third species, wherein the third subset of wavelengths is different from the first subset of wavelengths and the second subset of wavelengths.

14. The method of claim 12, wherein determining the plurality of species number densities includes determining a third number density of a third species based on the second set of optical transmission values from the backscatter data for the second subset of wavelengths and the second attenuation cross-section.

15. The method of claim 12, wherein determining the first number density further comprises determining an optical depth of the first subset of wavelengths, wherein the optical depth of the first subset of wavelengths is a function of the first optical transmission value.

16. The method of claim 15, wherein determining the first number density additionally comprises fitting the first number density to the determined optical depth of the first subset of wavelengths.

17. The method of claim 12, further comprising:
receiving, at the computing system, second backscatter data indicative of backscatter of a second pulse of radiation detected by the receiver; and
determining a second plurality of species number densities along a second travel path of the second pulse of radiation, wherein determining the second plurality of species number densities includes determining a third number density of the first species based on a third set of optical transmission values from the second backscatter data for the first subset of wavelengths of the plurality of wavelengths and the first attenuation cross-section of the first species.

18. A computing system comprising:
a processor; and
memory that stores computer-executable instruction that, when executed by the processor, cause the processor to perform acts comprising:
receiving backscatter data from a receiver indicative of backscatter of a pulse of radiation detected by the receiver, wherein the pulse of radiation comprises radiation having a plurality of wavelengths, wherein the pulse of radiation is emitted by a laser source;
computing optical depth values for the plurality of wavelengths based upon the backscatter data received from the receiver; and
determining a plurality of species number densities along a travel path of the radiation based upon the optical depth values, wherein determining the plurality of species number densities includes determining a first number density of a first species based on a first optical depth value from the backscatter data for a first wavelength of the plurality of wavelengths and a first attenuation cross-section of the first species, wherein determining the plurality of species number densities includes determining a second number density of a second species based on a second optical depth value from the backscatter data for a second wavelength in the plurality of wavelengths and a second attenuation cross-section of the second species, wherein the first wavelength and the second wavelength are different.

19. The computing system of claim 18, wherein determining the plurality of species number densities includes determining a third number density of a third species based on a third optical depth value from the backscatter data for a third wavelength in the plurality of wavelengths and a third attenuation cross-section of the third species, wherein the third wavelength is different from the first wavelength and the second wavelength.

20. The method of claim 19, wherein determining the first number density additionally comprises fitting the first number density to a computed optical depth of the first wavelength.

* * * * *